United States Patent [19]
Sekine

[11] 3,846,807
[45] Nov. 5, 1974

[54] AUTOMATIC EXPOSURE CONTROL DEVICE FOR PHOTOGRAPHIC CAMERAS

[75] Inventor: Jiro Sekine, Tokyo, Japan

[73] Assignee: Fuji Photo Film Co., Ltd., Kanagawa, Japan

[22] Filed: Feb. 14, 1974

[21] Appl. No.: 442,554

[30] Foreign Application Priority Data
Feb. 14, 1973 Japan.............................. 48-18629

[52] U.S. Cl.................... 354/42, 352/141, 354/271
[51] Int. Cl. .......................................... G03b 9/02
[58] Field of Search .......... 354/42, 43, 44, 59, 271; 352/141

[56] References Cited
UNITED STATES PATENTS
| | | | |
|---|---|---|---|
| 3,584,558 | 6/1971 | Easterly | 352/141 |
| 3,589,258 | 6/1971 | Koeber | 352/141 |
| 3,651,748 | 3/1972 | Yoshiada | 352/141 |

Primary Examiner—Samuel S. Matthews
Assistant Examiner—Russell E. Adams, Jr.
Attorney, Agent, or Firm—Sughrue, Rothwell, Mion, Zinn & Macpeak

[57] ABSTRACT

An automatic exposure control device for a camera for controlling a diaphragm in accordance with the illumination of an object to be photographed comprising a photoreceptor which receives light from the object and generates an output current in proportion to the amount of light received, at least one movable diaphragm control blade moved in accordance with the output current from the photoreceptor for controlling the aperture size, and light intercepting means associated with the diaphragm control blade for reducing the amount of light received by the photoreceptor when the blade approaches the fully opened aperture position.

7 Claims, 4 Drawing Figures

PATENTED NOV 5 1974  3,846,807

AUTOMATIC EXPOSURE CONTROL DEVICE FOR PHOTOGRAPHIC CAMERAS

BACKGROUND OF THE INVENTION

1. Field of the Invention

This invention relates to an automatic exposure control device for cameras, and more particularly to an automatic exposure control means for compensation for the control of the exposure in the case of photographing an object of low illumination.

2. Description of the Prior Art

The conventional automatic exposure control device for a camera is provided with a photoelectric conversion element such as a cadmium sulfide element which detects the illumination of an object and generates an output to be converted into a mechanical operation. In mechanical operation, the diaphragm of the camera is controlled with reference to other factors such as film sensitivity, frame speed (in the case of motion pictures), shutter speed and the like.

The conventional type of the exposure control means has the disadvantage that the control of exposure in the range of low illumination is inaccurate because variations in the amount of light in low illumination range result in only small variations in the electric current generated.

In the low illumination range, the size of the diaphragm opening is changed to a great extent by a small variation in the illumination. For instance, the swing of the diaphragm control member from the full aperture size to the one-step smaller size is nearly a half of the full swing from the full aperture size to the minimum aperture size. Therefore, the conventional exposure control means has suffered from a shortage of current in the range of the low illumnation where the diaphragm is substantially fully opened. The diaphragm is therefore not opened sufficiently in the low illumination range.

A primary object of the present invention is therefore to provide an automatic exposure control device in which a large variation in the electric current is obtained in the low illumination range to obtain a correct control of the diaphragm in the low illumination range.

Another object of the present invention is to provide an automatic exposure control device in which a light intercepting member is provided in front of the photoreceptor to control the amount of the light received by the photoreceptor in the low illumination range to effect a large variation in the electric current.

Still another object of the present invention is to provide an automatic exposure control device which is compact in size and has a large swing of the diaphragm blades to obtain a correct exposure.

The above and other objects, features and advantages will be made apparent from the following description of the preferred embodiment thereof taken in conjunction with the accompanying drawings.

SUMMARY OF THE INVENTION

This invention provides an automatic exposure control device for a camera for controlling a diaphragm in accordance with the illumination of an object to be photographed comprising a photoreceptor which receives light from the object and generates an output current in proportion to the amount of light received, at least one movable diaphragm control blade moved in accordance with the output current from the photoreceptor for controlling the aperture size, and light intercepting means associated with the diaphragm control blade for reducing the amount of light received by the photoreceptor when the blade approaches the fully opened aperture position.

BRIEF DESCRIPTION OF THE ACCOMPANYING DRAWINGS

DESCRIPTION OF PREFERRED EMBODIMENTS

Figure 1:
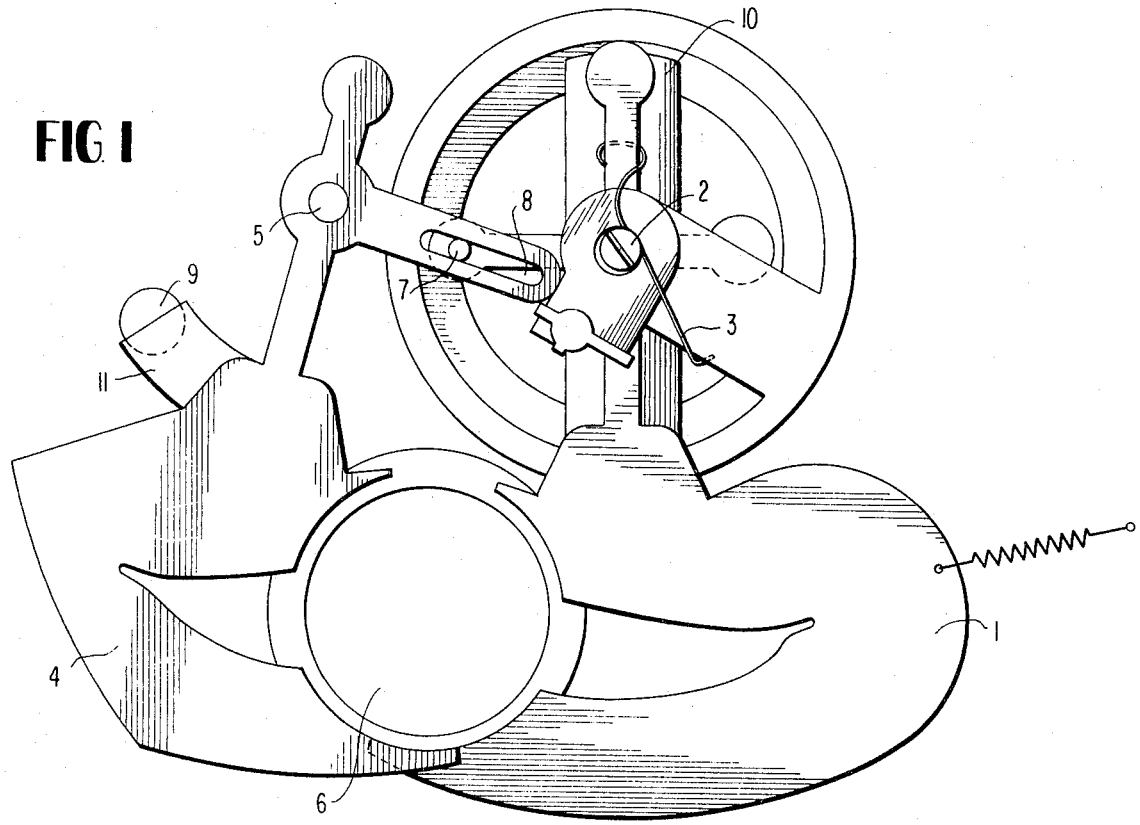
FIG. 1 is a front view of the automatic exposure control device in accordance with the present invention.

Referring to FIG. 1, a diaphragm blade 1 is rotatably mounted to a pivot 2 and normally urged in the counterclockwise direction by means of a spring 3. Another blade 4 is rotatably mounted to a pivot 5 and associated with the first blade 1 to control the quantity of light passing through the taking lens 6 of the camera. The two diaphragm blades 1 and 4 are engaged with each other by means of an engaging pin 7 and an engaging slot 8, and rotated in the opposite directions. When the first diaphragm blade 1 is rotated clockwise, the second blade 4 is rotated counterclockwise to reduce the size of the opening of the diaphragm.

The reference numeral 9 indicates a photoreceptor to receive light and to convert the amount of light into an amount of electric current in proportion thereto. A cadmium sulfide (CdS) element can be used, for instance, as the photoreceptor 9. The reference numeral 10 indicates a coil winding for generation of a magnetic force, the strength of which is in proportion to the electric current output from the photoreceptor 9. The coil winding 10 is mounted to the pivot 2 and operates to rotate the first diaphragm blade 1 clockwise. Since the diaphragm blade 1 is urged counterclockwise by the spring 3, the blade 1 is stopped when the torque created by the magnetic force of the coil winding 10, varying according to the electric current generated by the photoreceptor 9, balances the tension of the spring 3. Thus, the position of the blade 1 is controlled together with the blade 4 to obtain the correct exposure through the taking lens 6 to effect an exposure of the optimum value on the photosensitive material in the camera.

Figure 2A:
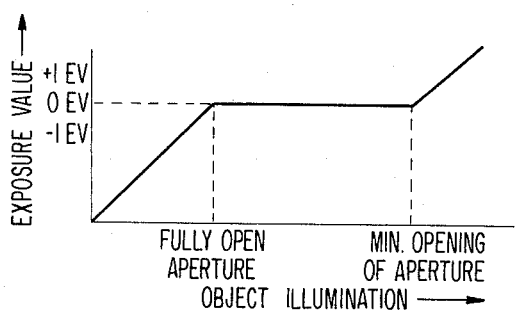
FIGS. 2a, 2b and 2c are graphical representations showing the relation between the brightness of the object and the size of the diaphragm.

The ideal exposure value is shown in FIG. 2a, in which the exposure value from the fully open condition to the minimum opening condition is indicated as being constant. In practice, however, the rotation of the diaphragm blade is insufficient in the vicinity of the fully open condition. The influence of the insufficient rotation of the blades is particularly great with a lens of large diameter. Accordingly, it is difficult to obtain a correct exposure in the vicinity of the fully open condition.

Figure 2C:
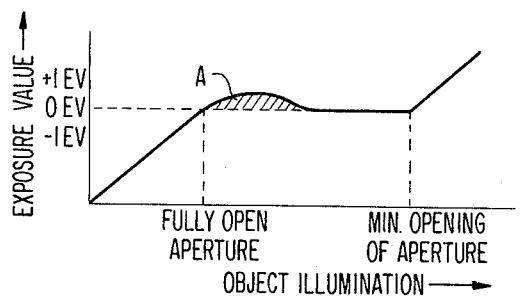
Figure 2B:
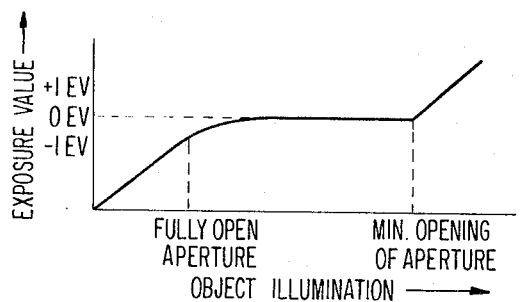

As shown in FIG. 2b, the exposure is insufficient, i.e., under exposure results, in the vicinity of the fully opened aperture and more closely approaches the correct exposure value as the brightness of the object increases. If the diaphragm control means is adjusted to have the correct exposure value at the fully opened aperture point, over exposure results at the portion of the diaphragm of a very small aperture size as shown in FIG. 2c.

In accordance with the present invention, a light intercepting portion 11 is provided on the diaphragm blade 4 to partially cover the photoreceptor 9 as shown in FIG. 1. The light intercepting portion 11 decreases the amount of light received by the photoreceptor 9 when the diaphragm 4 approaches the full aperture position. Thus, the variation in the electric current is enlarged when the diaphragm blades 1 and 4 approach the full aperture position. Consequently, the control of the exposure value is facilitated in the vicinity of the full aperture position since the variation in electric current is as shown in FIG. 2a.

The light intercepting portion 11 can be of the same material as that of the diaphragm blade 4. The light intercepting portion 11, if of a light intercepting material similar to the material of the diaphragm blade, is designed to cover about 40 to 50 percent of the entire area of the photoreceptor 9 when the diaphragm is in the fully open aperture position. In order to meet this requirement, the blades 1 and 4 and the position of the photoreceptor 9 are appropriately selected. The light intercepting portion 11 can be of a semi-transparent material such as a material used for an ND-filter. If the semi transparent material is a material which transmits 50 to 60 percent of the light incident thereto, the portion 11 is designed to cover the entire area of the photoreceptor 9 when the diaphragm is in the fully open aperture position. It will be readily understood that the light intercepting portion 11 can be constructed separately from the diaphragm blade 4 if the portion 11 is associated with the blade 4 so as to be moved in association therewith.

Further, although the above embodiment has been described with respect to two movable blades 1 and 4, the construction of the diaphragm blades can be of a type which comprises a stationary blade and a movable blade. It will further be understood that the present invention is applicable not only to a motion picture camera with an exposure measuring means which measures light separately from the light passing through the taking lens, but also to a camera with a TTL (through the taking lens) measuring system.

While the invention has been described in detail and with reference to specific embodiments thereof, it will be apparent to one skilled in the art that various changes and modifications can be made therein without departing from the spirit and scope thereof.

What is claimed is:

1. An automatic exposure control device for a camera for controlling a diaphragm in accordance with the illumination of an object to be photographed comprising a photoreceptor which receives light from said object and generates an output current in proportion to the amount of light received, at least one movable diaphragm control blade moved in accordance with the output current from said photoreceptor for controlling the aperture size, and light intercepting means associated with said diaphragm control blade for reducing the amount of light received by said photoreceptor when said blade approaches the fully opened aperture position.

2. The automatic exposure control device for a camera as defined in claim 1, wherein said light intercepting means is a light intercepting portion integrally connected with said blade.

3. The automatic exposure control device for a camera as defined in claim 2, wherein said light intercepting portion is an opaque material.

4. The automatic exposure control device for a camera as defined in claim 2, wherein said light intercepting portion is a semi-transparent material.

5. The automatic exposure control device for a camera as defined in claim 1, wherein said light intercepting portion is a member associated with said diaphragm blade and moved in association therewith.

6. The automatic exposure control device for a camera as defined in claim 5, wherein said light intercepting portion is an opaque material.

7. The automatic exposure control device for a camera as defined in claim 5, wherein said light intercepting portion is a semi-transparent material.

* * * * *